Figure 1:
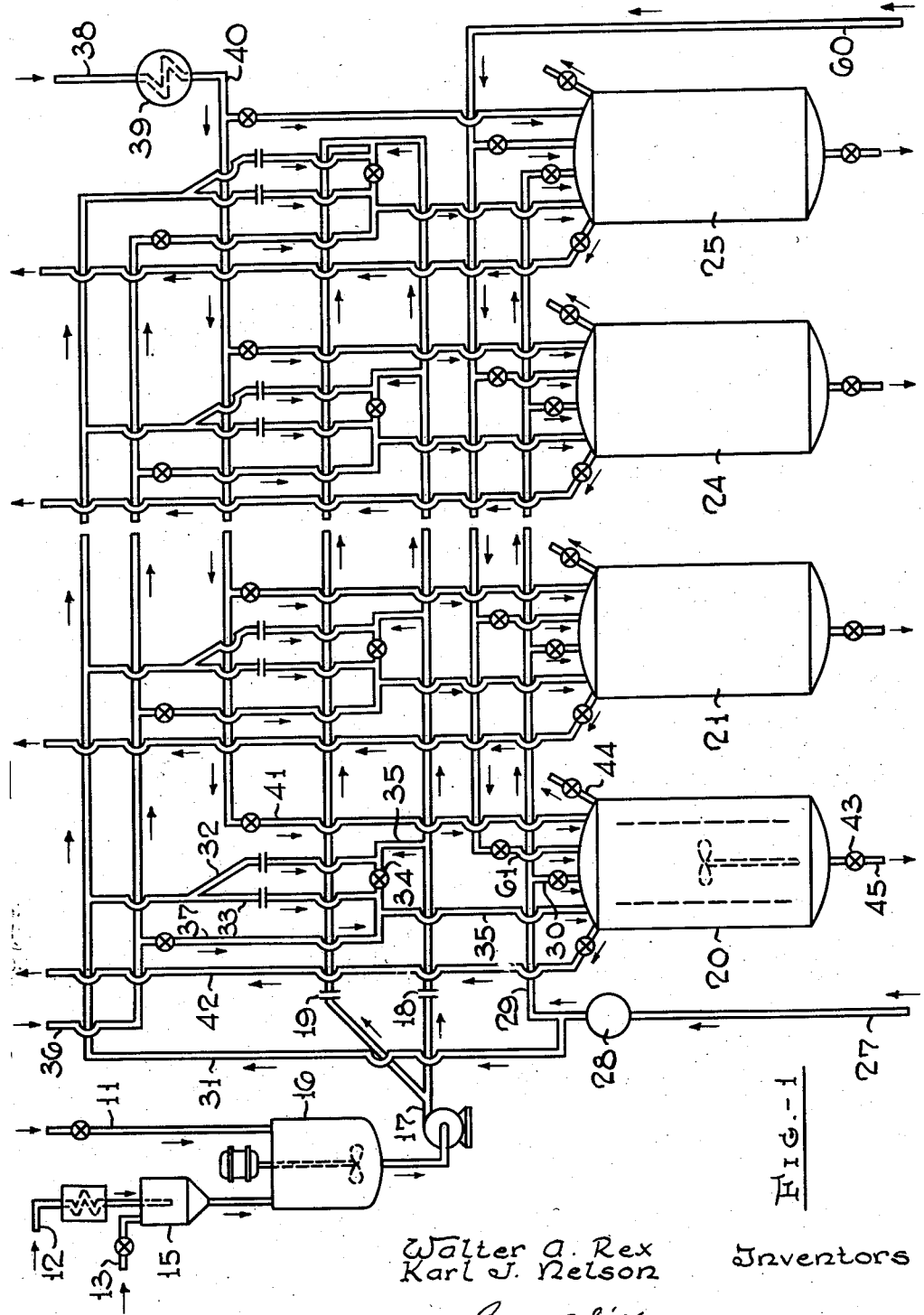

Dec. 4, 1951  W. A. REX ET AL  2,577,631
MANUFACTURE OF MICROSPHEROIDAL GEL PARTICLES
Filed Dec. 29, 1948  2 SHEETS—SHEET 1

Walter A. Rex
Karl J. Nelson  Inventors

By George J. Silhavy  Attorney

Patented Dec. 4, 1951

2,577,631

UNITED STATES PATENT OFFICE 2,577,631

MANUFACTURE OF MICROSPHEROIDAL GEL PARTICLES

Walter A. Rex, Westfield, and Karl J. Nelson, Cranford, N. J., assignors to Standard Oil Development Company, a corporation of Delaware Application December 29, 1948, Serial No. 68,028

8 Claims. (Cl. 252—448)

The present invention relates to an improved process and apparatus for the production of finely divided microspheroidal gel particles which may be employed arvantageously for catalytic cracking, adsorption and other purposes.

It has been proposed to produce inorganic gels as fine, microspherical or microspheroidal particles by dispersing fine droplets of the desired sol in an immiscible setting medium and maintaining the sol droplets in dispersed condition in that medium until they have set to firm gel particles. The resultant gel particles are smooth spheres or spheroids which are especially advantageous in numerous processes, particularly those involving the fluidized solids technique since the smooth rounded particles reduce erosion of the equipment to a minimum and minimize losses of catalyst or contact particles due to attrition. Moreover, the necessity of grinding the gel in order to obtain the desired particle size distribution in the catalyst or contact particle mass is avoided since the size of the spheroids is readily controlled in the manufacturing process.

One particular method of preparing spherical or spheroidal gel particles is the emulsion technique wherein a hydrosol of the desired gel is emulsified as the disperse phase in a water-immiscible liquid, agitating the emulsion to prevent agglomeration or coalescence of the hydrosol particles until they have set to a gel and then separating the gel particles from the water-immiscible liquid. The size of the gel particles may be controlled with a considerable degree of accuracy by varying the degree of agitation of the emulsion and the concentration of emulsifying agent employed. The particles formed are remarkably uniform in size and are spherical or spheroidal in form.

In order to prepare spherical or spheroidal gel particles in commercial quantities, it is practically necessary to produce them continuously. A truly continuous system for setting and ammoniating the hydrogel microspheres would involve adding the sol to several agitated reactors in series and withdrawing the set, ammoniated gel from the last vessel. Such a system has been found to be unsatisfactory for microspherical catalyst preparation, at least for the type of agitators, dispersion oils, emulsifying agents and hydrosol concentrations presently contemplated because of plugging of equipment, poor sphere formation and the difficulties in control.

It is the object of this invention to devise a method and apparatus which will permit the production of these spherical or spheroidal gel particles continuously and in large quantities.

It is also the object of this invention to prepare silica-alumina cracking catalysts of high activity and stability in spherical or spheroidal form continuously and in large quantities.

These and other objects will appear more clearly from the following specification and claims.

In accordance with the present invention, overall continuous performance of the system is achieved by utilizing several batch reactors operated on a fixed time cycle. Fully automatic operation of the system can be achieved by providing a timer which makes and breaks electrical contacts which control motor driven or air actuated valves used throughout the reactor piping. Because of the setting characteristics of the hydrosol employed in the process, it is highly important that stagnant spots be avoided in all transfer lines carrying this material. The sol must be continuously mixed, impregnated and pumped to the reactors. When shifting flow of sol from one reactor to another, dead spots are avoided in the lines in accordance with the present invention by the use of a pipe loop arrangement containing an orifice near the inlet to each side of the loop across which a substantial pressure drop is taken whereby the flow is distributed evenly between the two lines so that a positive flow will always be maintained in each line no matter which vessel is being charged with hydrosol.

In order to decrease the set time of the hydrosol, it is desirable to heat the sol. This is accomplished in accordance with the present invention by injecting steam directly into the hydrosol immediately before charging it into the reactors thereby avoiding the use of indirect heat exchangers which would be rapidly fouled by setting of sol to gel on its surfaces. Direct steam injection also avoids a substantial temperature gradient in the reactor which would be encountered if the oil was heated sufficiently to give the desired final temperature of the emulsion. Separation of the dispersed gel particles from the oil or dispersing liquid may be readily effected by means of heated water, part or all of which can be used to flush out the reactor after setting and ammoniation of the gel have been completed. The present invention further provides for clarification of the dispersing oil in order to maintain the system in balance.

The invention will be further described in reference to the accompanying drawing which is a schematic flowplan for the reactor system.

In Fig. 1 of the drawing, 11 is a supply line for aluminum salt solution, preferably aluminum sulfate solution, 12 is a supply line for sodium silicate solution and 13 is a supply line for sulfuric or other mineral acid which is used for forming silica hydrosol by reaction with sodium silicate solution. The sodium silicate solution supplied through line 12 is passed through heat exchanger 14 in order to adjust its temperature to the desired point for admixture with the acid to form the silica hydrosol. The sodium silicate and the acid solution are continuously and intimately mixed together in a suitable mixing nozzle 15 in such proportions as to form a silica hydrosol of the desired composition and of definite set time. The set time must be long enough so that setting will not occur prior to charging to the reactor but short enough to give a practical setting time after heating and charging it into the reactor. For example, if the charging time of the reactor in the cycle of operations is fifteen minutes, the sol should have a set time of at least eighteen to twenty minutes. If the set time of the sol is less than the charging time for the reactor, there is a tendency for sol introduced in the late stages of the charging operation to deposit upon the sol particles first charged to the reactor which had at least partially set to gel.

The hydrosol is discharged from the mixing nozzle 15 into a mixing tank 16 which is provided with suitable agitating means. Aluminum salt solution is continuously supplied to mixing tank 16 from supply tank 11 and is thoroughly mixed with the silica hydrosol. A stream of the aluminum salt impregnated hydrosol is passed through line 17 and divided into two substreams before being passed into a loop arrangement which will be described below in greater detail and thence into a suitable reactor.

In accordance with the present invention, overall continuous performance is achieved by utilizing a plurality of batch reactors which are operated on a fixed timing cycle. In this system, it is preferred to provide a total of five operating reactors and one spare reactor. In the attached drawing, two reactors are omitted from the line to simplify the drawing. The reactors shown are numbered 20, 21, 24 and 25 in the drawing.

A type of reactor suitable for the present invention is shown in application Serial No. 577,826, filed February 14, 1945, by J. A. Pierce, C. N. Kimberlin, Jr., and K. J. Nelson, and now abandoned. In general, the reactor comprises a large casing provided with a centrally disposed draft tube and a motor driven agitator mounted either in the upper or lower end of the casing. It is desirable to provide each reactor with suitable spray nozzle means for washing down the interior of the reactor at the end of each cycle. These spray nozzles may be conveniently arranged upon two annular manifolds and so arranged as to direct sprays of water against the top of the casing as well as against the inner wall of the casing and both walls of the draft tube. Since these reactors are operated batchwise and are, therefore, only partially filled with dispersing oil when the introduction of sol is started, it is desirable to cut several slots in the upper part of the draft tube in order to permit circulation to take place before the reactor is filled to the top of the draft tube.

A storage vessel 26 (shown in Fig. 2) is provided for the dispersion medium which can be a water-immiscible material such as an acid treated lube oil stock or the like or a partially water-miscible medium such as butanol or the like. The dispersion oil is supplied through line 27, heat exchanger 28 to line 29 from which there is a valve controlled feeder line 30 into each of the reactors. In order to simplify the drawing, the various feed and inlet lines to only one reactor, reactor 20 will be numbered, but it will be understood that each of the reactors is provided with the same piping and valve arrangements. A bleed oil line 31 is taken off the dispersion medium line 27 for supplying small quantities of oil through lines 32 and 33 to both sides of the control valve 34 in the sol feed inlet line 35 in order to prevent the sol from setting up in the inlet line during the periods when sol is not flowing through the inlet line 35. It will be understood that the sol inlet line will be so positioned as to provide ready drainage into the reactors and thereby prevent or minimize any tendency for the sol to accumulate in the feed inlet lines.

The main sol inlet line 17 as indicated above is arranged in the form of a closed circuit or loop above the group of reactors. As shown in the drawing, the sol inlet line 17 branches in the form of a Y to form the loop. Flow restriction orifices 18 and 19 are arranged at the inlet ends of the loop. By providing a pressure drop in each of the orifices 18 and 19 of about 15–20 lbs./sq. in., which is substantially greater than the pressure drop that occurs during flow through the loop, it is possible to insure substantially equal flows through both sides of the loop to each of the reactors. In this way, it is possible to maintain a continuous flow of sol through the entire sol inlet line, regardless of which reactor is being charged with sol. If this special flow controlled loop were not used but a single sol inlet line were provided, sol would flow through the entire line only when the furthermost reactor 25 is being charged. Since the sol normally has a setting time of from about 15 minutes up to about 60 minutes, it would be necessary to provide some means for purging the inlet line of sol to prevent the setting of sol to gel in those sections of the inlet line where flow is not occurring. This would require additional facilities as well as incur raw material losses.

In order to increase the rate and shorten the time of setting of hydrosol to hydrogel, it is necessary to heat the sol. It has been previously proposed to heat the hydrosol either by indirect heat exchange in a conventional exchanger or by heating the oil to such an extent that the sol is heated to the desired temperature in the reactor by contact with the oil. The first of these methods is objectionable because of the tendency of the sol to set in the exchanger tubes or in transfer lines following the exchanger because of its relatively short set time at the higher temperature. The second method is unsatisfactory because of the temperature gradient obtained during the introduction of the sol to the reactor. The sphere forming and particle size control characteristics of both the sol and the oil phase vary appreciably with even small changes in temperature, thus the temperature gradient greatly reduces control over particle size and shape.

In accordance with the present invention, the hydrosol is heated to the desired reactor temperature by injecting steam into the sol inlet line 35 a short distance above the reactor. 36 is the main steam line and 37 is a valve controlled feeder line for supplying steam to the transfer line 35. This steam injection technique effectively overcomes the objections to the other methods of heating in that the sol prior to admission into the dispersion oil is at the high reactor temperature only in the relatively short length of pipe leading from the injection point into the reactor and temperature gradients during the sol addition are also avoided. Compensation is made for the dilution effect of the steam condensate by adjusting the acid and/or sodium silicate concentrations and volumes used in forming the hydrosol in mixing nozzle 15.

When the hydrosol in reactor 20 has set to hydrogel spheres, it is necessary to precipitate hydrous alumina from the aluminum salt by the addition of a suitable alkali, preferably ammonia. Liquid anhydrous ammonia is withdrawn from storage tank (not shown) through line 38, vaporized in heat exchanger 39 and passed through main line 40 and valve controlled feeder line 41 into reactor 20. Upon completion of the ammoniation step, it is necessary or at least desirable to vent off each reactor before discharging the dispersion of gel particles from the reactor. Accordingly, a valved ammonia vent line 42 is provided on each of the reactors. The vent lines may discharge directly to the atmosphere or, in the event that the quantity of ammonia vented would constitute a nuisance, the vent line 42 may be discharged separately or the several vent lines may be manifolded and discharged through a water scrubber (not shown).

Figure 2:
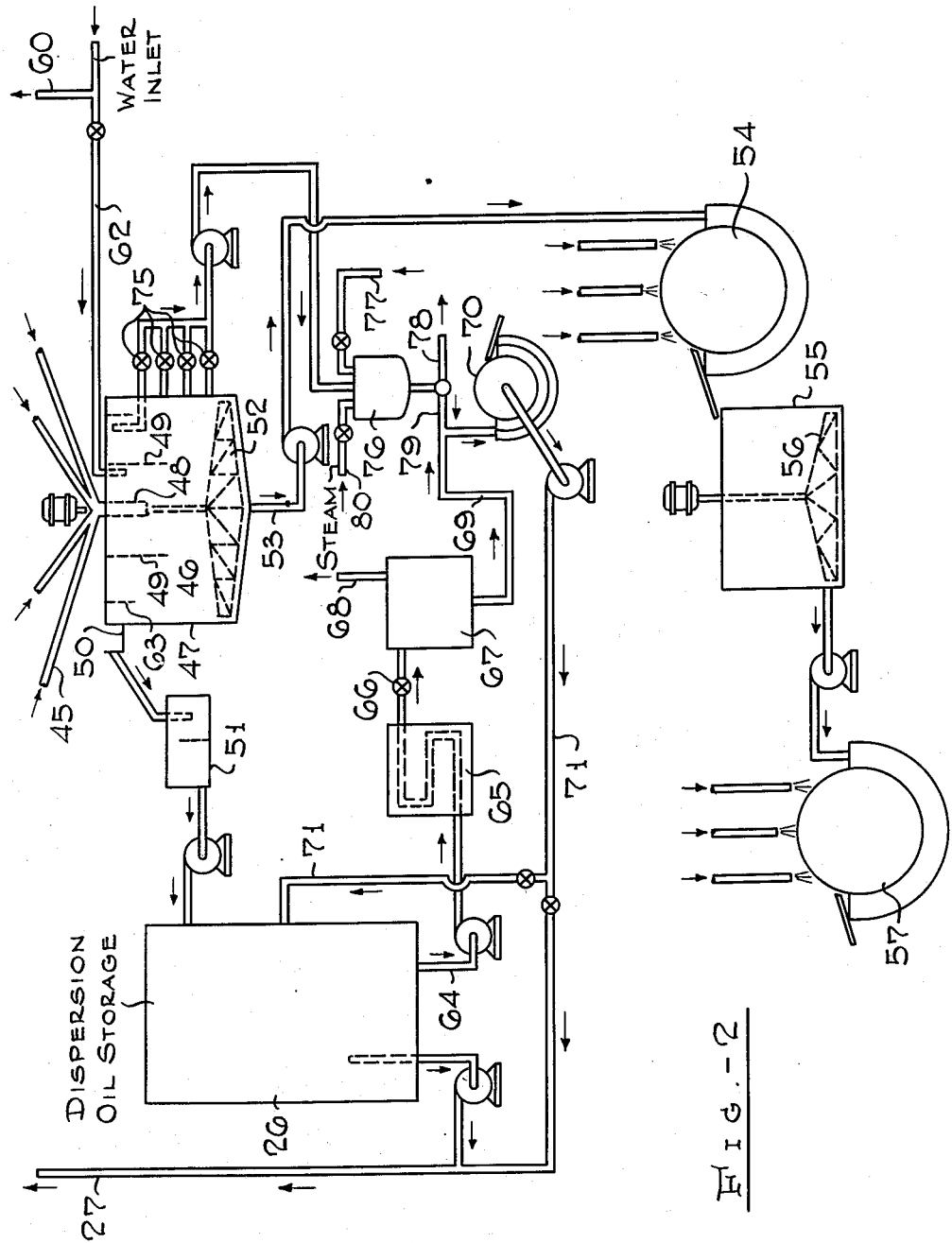

After ammoniation and venting of ammonia, the reactor is discharged by opening flush valve 43 at the bottom and air vent valve 44 at the top of the reactor permitting the oil-gel slurry to discharge through line 45 into the oil-water separator 46 shown in Fig. 2. Provisions are needed for flushing the reactors after each batch to prevent setting and build up of gel on the reactor surfaces. The flushing is accomplished immediately after discharging the oil-gel mixture from the reactor by introducing water, preferably heated to about 200° F. into the reactor through water main 60 and inlet line 61 to the manifold and spray nozzles arranged as described above to permit thorough flushing of the interior surfaces of the reactor. During the period when water is not being admitted to the reactors for flushing, the water is diverted to the oil-water separator 46 through valved line 62 in order to adjust the concentration of the gel slurry to an operable range for pumping. Since the water utilized in flushing the reactor is discharged through lines 45 and 48 into the oil-water separator it may be seen that this water is also effectively utilized in the operation of the oil-water separator.

The oil-water separator 46 is essentially a Dorr thickener and comprises a large tank 47 of sufficient capacity to receive the contents of several reactors plus water for slurrying the gel particles, a centrally disposed inlet pipe 48 and an annular baffle 49 for preventing the short circuiting of oil-gel slurry to the oil overflow 50. The oil separated from the water slurry of gel particles passes over the overflow 50 into the surge tank 51 and thence back into the oil storage tank 26. A baffle 63 is preferably provided in order to prevent the froth or scum which accumulates at the top of the separator from passing over the overflow with the oil. A rotatable arm 52 is arranged in the separator 46 in order to prevent the gel particles from accumulating or agglomerating at the bottom of the tank 47 as well as to assist in disengaging entrained oil droplets.

The slurry of gel particles in water is removed from separator 46 through line 53, filtered, and water washed on the filter 54 to a sulfate content below about 2.5% and less than 0.3% $Na_2O$. The washed gel particles are reslurried in water and aged in tank 55 which is provided with a suitable motor driven agitator 56. The aged slurry is refiltered and washed on filter 57 whereupon the gel particles are dried in suitable rotary drying equipment (not shown).

Finely divided suspensions of solids and water of a colloidal nature tend to accumulate in the dispersion oil which adversely affect the sphere forming properties of the dispersion medium. It is necessary therefore to provide means for clarifying the oil. This can be accomplished by substantially continuously withdrawing a stream of oil from the storage tank 26 equal to about 0.5 to 5.0% of the circulating stream, passing it through line 64 to heater 65 where it is heated under mildly superatmospheric pressure such as about 10 lbs./sq. in. to about 215° F. to 235° F. The heated oil is then discharged through a pressure reducing valve 66 into flash drum 67 wherein the water is flashed off at essentially atmospheric pressure, the water vapor leaving the flash drum at 68, the dried oil then being passed through line 69 to a suitable filtering or other separating means 70 for removal of solid materials contained in the oil. Heating and flashing in this manner avoids foaming in the treatment of the oil and serves to eliminate all of the entrained water and substantially improved the filtration rate of the oil. The clarified oil is then recycled to the oil storage tank 26 through line 71.

Undesirable secondary emulsion of water, aluminum floc, and hydrogel in oil is formed in separator 46 and must be removed and treated to recover its oil content. An oil-in-water type of emulsion is formed and accumulates near the water-oil interface while a water-in-oil type of emulsion is also formed and accumulates on top of the oil layer. Several outlet lines 75 are provided for withdrawing these emulsions from separator 46. Periodically these emulsions are withdrawn from separator 46 through outlet lines 75 and pumped to the treating and storage vessel 76. The emulsions are treated in batches in vessel 76 by introducing heated water or steam through line 77 and agitating for several hours. The water layer containing essentially all of the solids from the emulsions is withdrawn through line 78 and discarded. The oil is pumped intermittently to filter 70 through line 79 and the filtered oil is returned to the dispersion oil storage vessel 26 along with the main body of clarified oil.

The present invention is particularly adapted for the production of silica-alumina composite gel catalyst particles in spherical or spheroidal form. It will be understood, however, that it is broadly capable of use in the production of inorganic oxide gel particles in general such as silica gel, alumina gel as well as composite gels such as silica-magnesia and silica-alumina-magnesia gels.

The dispersion medium can be a hydrocarbon oil such as an acid treated lubricating oil stock, kerosene or the like, or it can be a partially water-miscible organic liquid such as normal butanol and the like or certain halogenated compounds such as carbon tetrachloride, ethylene dichloride, acetylene tetrabromide or the like. The size and shape of the gel particles depends to a certain extent upon the viscosity of the dispersing medium and accordingly mixtures of materials to provide a dispersing medium of the viscosity characteristics necessary are also contemplated. Normally the medium should have a viscosity of between 1 and 20 centipoises.

The size and shape of the gel particles also depend upon the following factors:

a. Degree of agitation during dispersion of sol in dispersing liquid.
b. Amount of emulsifying or surface active agent used to accomplish dispersion.
c. Ratio of dispersing medium to sol.
d. Temperature of emulsion.
e. Composition of sol.

The degree of agitation during dispersion, as indicated in application Ser. No. 577,826 referred to above should be at a propeller peripheral velocity of about 1200 to 1400 ft. per minute.

The amount of emulsifier used varies with the particular agent used as well as the particular dispersing medium and is best determined empirically for the dispersion medium, sol, etc.

The ratio of dispersing medium to sol in the system should be at least one to one and is generally about 5 to 1 although ratios as high as about 10 to 1 can be used.

As indicated above, the composition of the sol should be adjusted to compensate for the dilution caused by the steam condensate. The optimum temperature for setting of the sol can be readily determined empirically and if the determined optimum temperature does not represent a desirable operating temperature, the pH or composition of the sol may be altered or adjusted in order to give the desired setting time and/or temperature.

The followng examples will seve to illustrate the manner in which the present invention may be carried out.

The catalyst prepared will conform to the following chemical analysis:

Weight per cent on bone dry catalyst
| | |
|---|---|
| $SiO_2$ | 79–80 |
| $Al_2O_3$ | 19–21 |
| $SO_4$ | 0.75 max. |
| $Na_2O$ | 0.15 max. |
| $MgO$ | 0.10 max. |
| $Fe_2O_3$ | 0.05 max. |

The following particle size specification will be met:

Particle size:
| | |
|---|---|
| 0–20 microns | 3% max. |
| 20–200 microns | 90% min. |
| 100+ microns | 7% max. |
| −149 microns | 99% min. |

36 G. P. M. of a 25° Bé. sodium silicate solution are withdrawn from storage tank 12 cooled to about 100° F. in heat exchanger 14 and mixed with 15 G. P. M. of a 26° Bé. sulfuric acid solution in mixing nozzle 15 and the resultant hydrosol is discharged into mixing tank 17. About 19 G. P. M. of a 34.5° Bé. aluminum sulfate solution are withdrawn from tank 11 and intimately mixed with the silica hydrosol in mixing tank 16 to form "impregnated" hydrosol.

An acid treated lubricating oil stock from a coastal crude oil containing from 0.06 to 0.6 cc. "Alkaterge-O" per gallon is pumped into a reactor at a temperature of about 160° F. "Alkaterge-O" is a surface active agent sold by Commercial Solvents Co. and is believed to be a substituted oxazoline in the form of an oil-soluble dark brown viscous liquid. When a reactor is about 80% filled with oil, oil supply is discontinued, and vigorous agitation is imparted to the oil. Impregnated hydrosol is then supplied to the sol inlet line 35 at the rate of about 69 gals. per minute while steam at 100 p. s. i. g. is supplied to the inlet line 35 through line 37 in sufficient amount to raise the temperature of the hydrosol to about 161° F. At this temperature the set time of the impregnated hydrosol is about 18 minutes and accordingly agitation of the charged reactor for 18 minutes will suffice to convert the dispersed hydrosol droplets into spherical hydrogel particles.

After setting is complete, ammonia, withdrawn from storage drum thru line 38, vaporized in heat exchanger 39 is introduced into the reactor in an amount sufficient to effect about 85% neutralization of the acid and to precipitate the aluminum sulfate throughout the gel structure as $$Al_2O_3.XH_2O$$

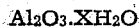

When this degree of ammoniation has been effected, excess ammonia is vented from the reactor and the reactor contents are dumped into the oil separator tank 46 whereupon the reactor is flushed with water at 200° F. to remove particles of gel that may adhere to the reactor surfaces. The dispersion oil separates from the water slurry of gel particles and is discharged from the separator tank 46 through overflow 50 and surge tank 51 into the oil storage tank 26.

In order to clarify the dispersion oil and maintain its dispersing properties, oil is withdrawn from storage tank 26 at the rate of 8.5 gals. per minute, heated to 220° F. under a pressure of about 10 lbs. per square inch and then flashed down to atmospheric pressure to remove entrained water whereupon the oil is filtered to remove solids whereupon the clarified oil is returned to the storage 26 or is passed directly to the oil feed line 27.

The water slurry of gel particles is withdrawn through line 53 and is filtered and washed on filter 54 to a sulfate content of about 0.75%. The washed gel particles are then reslurried in water and then aged in tank 55 in contact with water at about 200° F. for a period of at least 20 hours after which the slurry of gel particles in water is again filtered and washed on filter 57 whereupon the gel is dried. This sequence of filtering and washing prior to aging allows the salts to be easily removed and it substantially decreases the aging time which is absolutely essential for obtaining catalyst having superior catalytic qualities.

The importance of this sequence to catalyst purity and activity can be readily seen from the following comparisons.

In procedure 1, the water slurry of gel removed from the oil-water separator was washed and aged concurrently. Aging was for 48 hours at 200° F. whereupon the washed and aged gel was filtered, dried and subjected to standard cracking tests.

In procedure 2, the water slurry of gel removed from the oil-water separator was aged for 20 hours at 200° F., then washed, filtered and dried. The resultant gel was subjected to the same standard cracking tests.

In procedure 3, the water slurry of gel removed from the oil-water separator, filtered and washed immediately, then aged for 20 hours at 200° F., filtered, washed and dried whereupon the gel was subjected to the same standard cracking tests.
The results obtained are summarized in the following table:

Table I

| Procedure | 1 | 2 | 3 |
|---|---|---|---|
| SO₄ Wt. Per cent | 2.3 | 0.8 | 0.8 |
| Na₂O, Wt. Per cent | 0.51 | 0.22 | 0.05 |
| Heat Stability, Per cent D+L on Heating at 1600° F. for three hours | 31 | 33.5 | 45.6 |
| Steam Stability, Per cent D+L on Steaming under 60 p. s. i. g. at 1050° F. for 24 hours | 22.9 | 24.0 | 31.8 |

Procedure 2 above was repeated except that the aging was for a period of 40 hours. The resultant gel particles contained 3.9% SO₄ and 0.67% of Na₂O.

Procedure 3 above was repeated except that the aging time was varied. The results are summarized in the following table:

Table II

| Procedure | 3 | | |
|---|---|---|---|
| Aging Time, Hours | 10 | 20 | 40 |
| SO₄, wt. per cent | 0.05 | 0.5 | 0.3 |
| Na₂O, wt. per cent | 0.09 | 0.08 | 0.11 |
| Heat Stability, per cent D+L on heating at 1600° F. for three hours | 10.3 | 45.6 | 33.8 |
| Steam Stability, per cent D+L on heating under 60 p. s. i. g. at 1050° F. for 24 hours | 18.8 | 31.8 | 31.8 |

It may be seen from the foregoing data that the sequence of washing out salts immediately followed by aging rather than by aging during washing or aging and then washing gives a more stable and uniform catalyst.

By employing a cycle timing device and suitable mechanically actuated valves it is possible to have the reactor system operate automatically. A typical cycle of operations for a single reactor would be as follows:

|   | Time, minutes |
|---|---|
| 1. Pumping oil | 15 |
| 2. Pumping sol | 15 |
| 3. Agitate for setting | 18 |
| 4. Ammoniate | 10 |
| 5. Release NH₃ pressure | 1 |
| 6. Discharge to oil-water separator | 7 |
| 7. Flush with water | 5 |
| 8. Drain and idle time | 4 |
| Total | 75 |

Using a battery of five reactors as shown it would be possible to so integrate the cycle of each reactor that pumping of oil and sol would be continuous and at a uniform rate while the flow of ammonia would be periodic. The flow of water would also be continuous and uniform since it would be discharged directly into the oil-water separator 46 through line 62 when not needed for flushing down the reactors.

The apparatus of the present invention is described and claimed in copending divisional application, Serial No. 176,978, filed on August 1, 1950.

It will be understood that numerous variations are possible without departing from the scope of the following claims.

What is claimed and desired to be secured by Letters Patent is:

1. A process for the production of an inorganic oxide gel in the form of microspheroidal particles by dispersion and gelation of a hydrosol of said oxide in an organic liquid setting medium which is at most only partially miscible with water, which comprises continuously withdrawing a stream of the hydrosol from a common hydrosol source, dividing the withdrawn stream of hydrosol into two substreams forming a closed supply circuit having outlets to a plurality of separate gelation zones, which zones are partially filled with the organic liquid setting medium and are distributed around the aforesaid circuit, and successively supplying the hydrosol from the circuit to each of the said gelation zones, whereby a continuous flow of hydrosol in all parts of the circuit is maintained at all times so that stagnation and gelation of the hydrosol in the circuit is prevented.

2. A process according to claim 1 wherein each of the substreams is passed through a flow restrictive zone which provides a pressure drop substantially greater than that which is incurred by either substream in its flow from the restrictive zone to any of the said gelation zones.

3. A process according to claim 2 wherein the liquid setting medium is a hydrocarbon oil.

4. A process according to claim 2 wherein the liquid setting medium is a hydrocarbon oil and wherein the hydrosol contains a silica hydrosol prepared by mixing an alkali metal silicate with an inorganic acid, which process comprises the specific steps of heating the hydrocarbon oil setting medium to the optimum temperature for setting the silica hydrosol, and heating the silica hydrosol at least to the temperature of the setting medium by injecting steam directly into the hydrosol just before the latter is discharged into the setting medium.

5. A process for the production of inorganic oxide gels in the form of microspheroidal particles by dispersion of a hydrosol of said oxides in an organic liquid setting medium which is at most only partially miscible with water and which is recycled in the process, which process comprises dispersing hydrosol droplets in said organic liquid, agitating the mixture in order to maintain the hydrosol droplets dispersed as separate discrete particles until the hydrosol has set to hydrogel, treating the resultant dispersion of hydrogel particles with water, separating a water slurry of gel particles from the organic liquid, heating at least a portion of the organic liquid under superatmospheric pressure to a temperature above about 215° F., reducing the pressure upon the heated organic liquid to substantially atmospheric pressure thereby flashing off any water entrained in the organic liquid, filtering the organic liquid in order to remove solid contaminants therefrom and reusing the clarified organic liquid for dispersing further quantities of hydrosol.

6. A process for the production of spheroidal silica-alumina cracking catalyst particles of uniform shape and size and high activity and stability which comprises continuously mixing sodium silicate and a mineral acid in suitable amounts to form a silica hydrosol, continuously adding an aluminum salt solution to said silica hydrosol, directly injecting steam into a stream of the aluminum salt-containing silica hydrosol to raise the temperature of the stream to at least the optimum temperature for setting the hydrosol to hydrogel, adding the heated stream of hydrosol to a gelation zone partially filled with an organic liquid which is at most only partially miscible with water and which contains a surface active agent, the temperature of the organic liquid being substantially the optimum temperature for setting the hydrosol, vigorously agitating the contents of the gelation zone during the hydrosol addition to emulsify the hydrosol in the organic liquid, converting the hydrosol to hydrogel, adding ammonia to the reactor in an amount sufficient to neutralize about 85% of the acid and precipitate the aluminum salt as aluminum hydrate throughout the hydrogel, releasing ammonia contained in the gas phase in the reactor, discharging the reactor contents and heated water into an organic liquid-water separator, withdrawing a stream of organic liquid from the separator and returning it to a storage vessel preparatory to recycling it to the reactor vessel, withdrawing a water slurry of gel particles from the separator separately from said oil stream, filtering and washing the water slurry of gel particles, reslurrying the gel particles in water at about 200° F., maintaining the gel particles in contact with water at or above that temperature for at least 20 hours, filtering and again washing the gel particles and then drying the latter.

7. A process for the continuous production of spheroidal silica-alumina particles of high activity and stability and uniform size which comprises continuously mixing a sodium silicate solution and a sulfuric acid solution in a first mixing zone in amounts suitable to form a silica hydrosol, continuously withdrawing the resultant hydrosol and mixing and impregnating it in a second mixing zone with an aluminum sulfate solution, withdrawing a stream of impregnated hydrosol from said second mixing zone and dividing said stream into two sub-streams which form a closed circuit having a plurality of outlets each leading to one of a plurality of gelation zones distributed around the circuit, passing each of the two sub-streams through a restricted zone which provides a pressure drop substantially greater than the pressure drop incurred by either sub-stream in its flow through the circuit between the restricted zone and any of the gelation zones, whereby a continuous flow of hydrosol in all parts of the circuit is maintained at all times and gelation of the hydrosol in the circuit is prevented, consecutively tapping off feed streams of impregnated hydrosol and passing each such feed stream through one of a plurality of withdrawal zones spaced on said circuit downstream from said restricted zones, injecting steam into the hydrosol stream in the withdrawal zone and promptly thereafter feeding the steam-heated hydrosol stream into one of a plurality of gelation zones containing a pool of hydrocarbon oil maintained at substantially the optimum setting temperature of the hydrosol, dispersing the hydrosol in the oil pool and agitating the mixture until the dispersed hydrosol is converted into hydrogel particles, introducing ammonia into the gelation zone to precipitate alumina throughout the gel structure, dumping the resulting gel-in-oil dispersion into a separation zone, washing out gel remaining in the gelation zone with hot water, mixing the resulting gel-containing wash water with the gel-in-oil dispersion, separating the oil from the resulting water slurry of gel particles, withdrawing said water slurry of particles from the separation zone, separating the gel particles from the slurry, washing and reslurrying the separated particles in water, aging the reslurried gel particles, separating the particles from the aged slurry and finally washing and drying the separated gel particles.

8. In a process for the continuous production of uniform spheroidal silica-alumina cracking catalyst particles of high activity and stability by dispersion in oil which is recycled in the process, the improvement which comprises continuously mixing a sodium silicate solution having a density of about 25° Bé. and cooled to about 100° F. with a sulfuric acid solution having a density of about 26° Bé. in a first mixing zone, the volume ratio of silicate solution to sulfuric acid solution being about 2.4/1, continuously discharging the resultant hydrosol to a second mixing zone and there mixing the said hydrosol with an aluminum sulfate solution having a density of about 34.5° Bé. to form an impregnated hydrosol, the volume ratio of hydrosol to aluminum sulfate solution being about 51/19; withdrawing a stream of impregnated hydrosol from said second mixing zone and dividing said stream into two sub-streams which form a closed circuit having a plurality of outlets each leading to one of a plurality of gelation zones distributed around the circuit, passing each of the two sub-streams through a restricted zone which provides a pressure drop of about 15 to 20 lbs./sq. inch which is substantially greater than the pressure drop incurred by either sub-stream in its flow in the circuit between the restricted zone and any of the gelation zones, whereby a continuous flow of hydrosol in all parts of the circuit is maintained at all times and gelation of the hydrosol in the circuit is prevented, consecutively tapping off feed streams of impregnated hydrosol and passing each such feed stream through one of a plurality of withdrawal zones spaced on said circuit downstream from said restricted zones so as to maintain continuous flow in all parts of said circuit, bleeding oil through the withdrawal zones not actually used for withdrawing hydrosol so as to prevent residual hydrosol from setting up in the unused withdrawal zones, injecting steam at about 100 p. s. i. g. into the hydrosol feed stream being withdrawn, the injected steam being in sufficient amount to raise the temperature of the feed stream to about 160° F., promptly charging said heated feed stream to one of a plurality of gelation zones containing an agitated pool of hydrocarbon oil having a viscosity between 1 and 20 centipoises, heated to about 160° F. and admixed with a small amount of a surface active agent, the charging being continued until the ratio of sol to oil in the gelation zone is between about 1:5 and 1:1, but in any case the time used for charging the hydrosol to the reaction zone being shorter than the setting time of the hydrosol; directly thereafter shutting off the aforesaid feed stream and starting to tap another feed stream from the sub-stream circuit to one of the other gelation zones for forming another batch of catalyst particles; dispersing the hydrosol in the aforesaid oil pool and continuing the agitation of the mixture for about 15 to 60 minutes to convert the dispersed hydrosol droplets into spherical hydrogel particles; thereafter introducing ammonia gas into said gelation zone in amount sufficient to effect about 85% neutralization of the acid present and to precipitate the alumina throughout the gel structure, venting excess ammonia, dumping the resulting gel-in-oil dispersion into a separation zone, thoroughly flushing residual gel from the emptied gelation zone with water at about 200° F. and discharging the resulting mixture of gel and water also into said separation zone; separating the oil from the resulting water slurry of gel particles and passing the separated oil to an oil storage zone for subsequent recycling to one of the gelation zones to form an oil pool therein, withdrawing a minor stream of oil from the bottom portion of said oil storage zone and heating said minor oil stream equal to about 0.5 to 5% of the oil circulating in the process to about 215 to 235° F. under a pressure of about 10 p. s. i. g., flashing said minor oil stream down to atmospheric pressure to vaporize entrained water therefrom, filtering solids from the dewatered oil and returning the resulting clarified oil to the process; withdrawing the water slurry of gel particles from the aforesaid separation zone, filtering said slurry, washing the filtered gel particles to a sulfate content of about 0.75%, reslurrying the filtered and washed gel particles in water, aging the resulting reconstituted water slurry at about 200° F. for at least 20 hours, filtering the aged slurry, and finally washing and drying the filtered gel particles for use as catalyst.

WALTER A. REX.
KARL J. NELSON.

REFERENCES CITED

The following references are of record in the file of this patent:

UNITED STATES PATENTS

| Number | Name | Date |
|---|---|---|
| 2,384,946 | Marisic | Sept. 18, 1945 |
| 2,412,958 | Bates et al. | Dec. 24, 1946 |
| 2,418,232 | Marisic | Apr. 1, 1947 |
| 2,429,751 | Gohr et al. | Oct. 28, 1947 |
| 2,435,379 | Archbald | Feb. 3, 1948 |
| 2,442,387 | Valas | June 1, 1948 |
| 2,464,329 | Marisic et al. | Mar. 15, 1949 |
| 2,467,470 | Gerhold et al. | Apr. 19, 1949 |